United States Patent
Baeuerlein et al.

(10) Patent No.: US 10,177,624 B2
(45) Date of Patent: Jan. 8, 2019

(54) ELECTRIC MACHINE HAVING A FIRST CIRCUIT AND A SECOND CIRCUIT, METHOD FOR COOLING AN ELECTRIC MACHINE AND MOTOR VEHICLE HAVING AN ELECTRIC MACHINE

(71) Applicant: SIEMENS AKTIENGESELLSCHAFT, Munich (DE)

(72) Inventors: Frank Baeuerlein, Postbauer-Heng (DE); Joachim Feld, Nuremberg (DE); Ardian Tropoja, Muennerstadt (DE)

(73) Assignee: Siemens Aktiengesellschaft, Munich (DE)

( * ) Notice: Subject to any disclaimer, the term of this patent is extended or adjusted under 35 U.S.C. 154(b) by 412 days.

(21) Appl. No.: 14/821,975

(22) Filed: Aug. 10, 2015

(65) Prior Publication Data
US 2016/0043608 A1 Feb. 11, 2016

(30) Foreign Application Priority Data
Aug. 8, 2014 (DE) .................. 10 2014 215 758

(51) Int. Cl.
*H02K 5/20* (2006.01)
*H02K 7/116* (2006.01)
*H02K 9/19* (2006.01)
*H02K 9/22* (2006.01)

(52) U.S. Cl.
CPC ............... *H02K 5/20* (2013.01); *H02K 7/116* (2013.01); *H02K 9/19* (2013.01); *H02K 9/22* (2013.01)

(58) Field of Classification Search
CPC .......... H02K 7/116; H02K 9/193; H02K 9/19; H02K 9/22; H02K 5/20
USPC ...... 310/54, 58, 59, 61, 83, 89; 165/165, 154
See application file for complete search history.

(56) References Cited

U.S. PATENT DOCUMENTS

| | | | |
|---|---|---|---|
| 5,129,144 A * | 7/1992 | Halstead .............. | B60H 1/3227 29/890.035 |
| 9,022,647 B2 * | 5/2015 | Jentz ........................ | F01P 11/16 374/145 |
| 2004/0163409 A1 | 8/2004 | Nakajima et al. | |
| 2012/0011867 A1 * | 1/2012 | Koons ..................... | F25B 39/04 62/115 |

(Continued)

FOREIGN PATENT DOCUMENTS

JP 2000295818 A 10/2000
JP 2010263715 A 11/2010

*Primary Examiner* — Forrest M Phillips
(74) *Attorney, Agent, or Firm* — Laurence A. Greenberg; Werner H. Stemer; Ralph E. Locher

(57) ABSTRACT

An electric machine includes a first circuit through which a first working fluid can flow and a second circuit through which a second working fluid can flow. The first circuit and the second circuit are formed hermetically. In order to cool the electric machine particularly well, the first circuit and the second circuit have a common heat exchanger surface which is constructed in such a way that thermal energy from the first working fluid of the first circuit can be transmitted to the second working fluid of the second circuit or vice versa from the second working fluid to the first working fluid by way of the heat exchanger surface. A method for cooling an electric machine and a motor vehicle having an electric machine are also provided.

30 Claims, 3 Drawing Sheets

(56) References Cited

U.S. PATENT DOCUMENTS

| | | | | |
|---|---|---|---|---|
| 2013/0062977 | A1* | 3/2013 | Watanabe | H02K 9/19 310/61 |
| 2013/0264897 | A1* | 10/2013 | Bradfield | H02K 1/20 310/58 |
| 2015/0267801 | A1* | 9/2015 | Bidner | F16H 57/0417 701/2 |

* cited by examiner

ELECTRIC MACHINE HAVING A FIRST CIRCUIT AND A SECOND CIRCUIT, METHOD FOR COOLING AN ELECTRIC MACHINE AND MOTOR VEHICLE HAVING AN ELECTRIC MACHINE

CROSS-REFERENCE TO RELATED APPLICATION

This application claims the priority, under 35 U.S.C. § 119, of German Patent Application DE 10 2014 215 758.7, filed Aug. 8, 2014; the prior application is herewith incorporated by reference in its entirety.

BACKGROUND OF THE INVENTION

Field of the Invention

The present invention relates to an electric machine having a first circuit through which a first working fluid can flow and a second circuit through which a second working fluid can flow. The first circuit and the second circuit are formed hermetically. In addition, the invention relates to a method for cooling an electric machine, in which a first working fluid flows through a first circuit and a second working fluid flows through a second circuit. The invention also relates to a motor vehicle having an electric machine.

When electrical energy is converted into mechanical energy in electric machines, such as motors for example, losses occur in the form of heat. These heat losses must be dissipated in order to prevent overheating and damage to the electric machine. Furthermore the dissipation of the heat may result in better efficiency.

Today, a cooling system of a converter and a motor is formed of a cooling circuit, in which a coolant mixture circulates, absorbs the heat losses and dissipates them to a working medium, e.g. the ambient air. If the electric machine has a rotor-integrated gearbox which is cooled by oil, two cooling circuits, a motor cooling circuit and a gearbox cooling circuit, with two heat exchangers, are necessary. FIG. 2 shows for example such a prior art motor with a rotor-integrated gearbox. As can be seen from FIG. 2, an electric machine 10 has a first circuit 18 and a second circuit 20. In this case a first working fluid flows through the first circuit 18 and a second working fluid flows through the second circuit 20. The first circuit 18 can for example be an oil cooling circuit for the gearbox. To this end the circuit 18 has an oil cooler 24, through the use of which thermal energy can be transmitted from the first working fluid of the first circuit 18 to a further (third) working fluid, e.g. to the ambient air. Furthermore, the first circuit 18 has a pump 22 to convey a first working fluid flowing through the first circuit 18. The second circuit 20 in that case is constructed as a cooling circuit of the motor.

SUMMARY OF THE INVENTION

It is accordingly an object of the invention to provide an electric machine having a first circuit and a second circuit, a method for cooling an electric machine and a motor vehicle having an electric machine, which overcome the hereinafore-mentioned disadvantages of the heretofore-known machines, methods and vehicles of this general type and which provide a particularly high cooling effect in an electric machine with low technical complexity and in a space-saving manner.

With the foregoing and other objects in view there is provided, in accordance with the invention, an electric machine, comprising a first circuit through which a first working fluid can flow, and a second circuit through which a second working fluid can flow. In this case the first circuit and the second circuit are formed hermetically. Furthermore the first circuit and the second circuit have a common heat exchanger surface, wherein the heat exchanger surface is constructed in such a way that thermal energy from the first working fluid of the first circuit can be transmitted to the second working fluid of the second circuit and/or vice versa from the second working fluid to the first working fluid by way of the heat exchanger surface. The direction of transmission can change, e.g. with time.

In other words, the second working fluid of the second circuit is used at least at times to cool or heat the first working fluid of the first circuit. To this end a second lateral surface can be disposed at a predefined distance in the region of a desired or predetermined heat transfer for example by way of the existing lateral surface of the tubes of the second circuit, by guiding the first working fluid of the first circuit along the lateral surface of the second circuit. This region of the lateral surface of the second cooling circuit thus forms the common heat exchanger surface of the first and second circuits. Since the circuits are hermetic in construction, an indirect heat transfer occurs by using the common heat exchanger surface, so that material flows are physically separated by a diathermal wall. In this way the first circuit is linked to the second circuit. The working fluids (first and second) can circulate in the first and second circuits so that in reverse flow they flow past one another in the opposite direction, and/or in direct flow they flow next to one another in the same direction.

The heat exchanger surface can advantageously be formed of a material with a thermal conductivity between 20 and 400 W/(m*K), in particular between 250 and 400 W/(m*K). The material can for example be copper and/or aluminum and/or plastic and/or glass and/or silicon carbide.

The advantage of the configuration of the first circuit at the second circuit is that the electric machine can be more compact in structure. This structural measure may result in a cost reduction for the cooling device for a motor by using the motor as one half of the cooler.

In accordance with another feature of the invention, the second circuit has a heat exchanger which is disposed upstream of the heat exchanger surface and through the use of which thermal energy can be transmitted from the second working fluid to a third working fluid. The third working fluid can for example be a coolant, which can be conveyed in a third circuit. Furthermore, the thermal energy can be dissipated from the second working fluid to the environment. Thus the third working fluid for example represents the ambient air. Due to the heat exchanger, which is coupled to the second circuit, it is possible to achieve a particularly high specific cooling effect.

In accordance with a further advantageous feature of the invention, the first working fluid can be an oil, in particular a gearbox oil. The advantage of this is that the gearbox oil has two functions at the same time. Firstly the gearbox oil is used to lubricate gearbox components and at the same time the thermal stability inside the gearbox must be ensured. No additional coolant is necessary to dissipate the thermal losses. Advantageously the first working fluid can be a lubricant, in particular a liquid lubricant.

In accordance with an added feature of the invention, the second working fluid is a coolant, in particular a water/glycol mix. In other words the second working fluid can be a liquid coolant. Water and/or a water/alcohol mix can for example be used as a liquid coolant. A mix (mixture) in this case means a substance formed of at least two pure substances. Furthermore the coolant can for example have a specific thermal capacity between $$2.2 \frac{kJ}{kg * K} \text{ and } 4.2 \frac{kJ}{kg * K},$$

in particular a specific thermal capacity between $$3.0 \frac{kJ}{kg * K} \text{ and } 3.5 \frac{kJ}{kg * K}.$$

These values for the thermal capacities of the coolant were measured at a temperature of 20° C. Due to the particularly high specific thermal capacity of the second working fluid, the heat dissipation of the first working fluid is particularly effective.

In accordance with an additional advantageous feature of the invention, the first circuit can have a conveying device for conveying a first working fluid flowing through the first circuit, wherein the conveying device can be integrated into a housing of the electric machine. The conveying device can for example be a pump. The conveying device can for example also work on the Archimedean principle and/or be conveyed in the circuit by using an Archimedean device, for example an Archimedes screw. Advantageously the first and/or the second working fluid can circulate in the circuits for example by convection and/or diffusion and/or by centrifugal forces. Furthermore, it is inventively provided that the first circuit is completely integrated into the housing of the electric machine.

In other words, in accordance with yet another feature of the invention, the first circuit, in which the first working fluid circulates, is structurally enclosed by the motor housing. This means that no additional lines or other external interconnections or conductor configurations are necessary. In other words, the first circuit can be integrated into the structure of the electric machine, the end shield for example. The advantage of this is that shorter circuit channels can be used for the connection. In addition savings can be made on the external pipework and the mechanical fixing of the additional external cooler. The costs can be reduced for the customer, because the customer saves on the mounting both of the pump and of the cooler and cooling hoses.

In accordance with yet a further advantageous feature of the invention, a mechanical gearbox can be integrated into the electric machine, wherein the first circuit is a cooling circuit for the gearbox and the second circuit is a cooling circuit for the rotor and/or the stator and/or the converter of the electric machine. In other words the first working fluid of the first circuit absorbs the thermal losses from the gearbox and passes these thermal losses to the second working fluid by way of the heat exchanger surface, whereas the second working fluid absorbs not only the thermal losses from the gearbox but also the thermal losses in the electric machine, in particular the thermal losses of the motor and/or of the converter, and dissipates these losses to the environment and/or a third working fluid.

With the objects of the invention in view, there is also provided a method for cooling an electric machine, in which a first working fluid flows through a first circuit and a second working fluid flows through a second circuit. In this case the first circuit and the second circuit are coupled together by way of a common heat exchanger surface, wherein thermal energy from the first working fluid of the first circuit is transmitted to the second working fluid of the second circuit and/or vice versa from the second working fluid to the first working fluid by way of the heat exchanger surface.

In accordance with another mode of the invention, advantageously thermal energy from the second working fluid of the second circuit can be transferred to a third working fluid by using a heat exchanger, which is disposed upstream of the heat exchanger surface.

In accordance with a further mode of the invention, thermal energy is transferred in a warm-up phase from the second working fluid to the first working fluid only while a temperature of the first working fluid is still below a predefined operating temperature of the first working fluid. "Warm-up phase" in this case means active warming up for the creation of an optimum operating state of the electric machine. A warm-up phase of an electric machine can for example be a start-up phase of the motor. "Operating temperature" in this case means a previously predetermined temperature level which ensures the optimum operation of the electric machine. In other words the first working fluid is heated up until it has reached a desired operating temperature. The advantage of this is that it is possible to warm the first working fluid up quickly and thereby to reduce gearbox losses in the start-up phase.

In accordance with an added mode of the invention, thermal energy is transferred from the first working fluid to the second working fluid only if a temperature of the first working fluid is above a predefined operating temperature. Due to the continuous heat transfer as a function of the corresponding temperature level of the first and/or second working fluid, the system/the electric machine is in a dynamic equilibrium.

When developing a construction plan for the electric machine, the mass flow of the first working fluid employed can be varied so that for a particular predefined mass flow predefined conditions for the second working fluid, such as the maximum temperature levels of the two working fluids in the first and second circuits, can be adjusted during operation. As a function of the assumed or simulated thermal losses of the electric machine during operation, the mass flow of the first working fluid can be inferred and adjusted, so that smooth operation of the electric machine can be ensured. In other words the temperature equilibrium can be adjusted by varying the mass flow of the first working fluid between the first circuit and the second circuit.

The developments described with reference to the electric machine of the invention can be transferred correspondingly to the method.

With the objects of the invention in view, there is concomitantly provided a motor vehicle having the electric machine of the invention.

Other features which are considered as characteristic for the invention are set forth in the appended claims.

Although the invention is illustrated and described herein as embodied in an electric machine having a first circuit and a second circuit, a method for cooling an electric machine and a motor vehicle having an electric machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advan-

DETAILED DESCRIPTION OF THE INVENTION

The exemplary embodiments explained below are preferred embodiments of the invention. However, in the exemplary embodiments the components of the embodiment which are described each represent individual features of the invention to be considered separately from one another, which each also develop the invention further independently of one another and thus are also to be regarded individually or in a combination other than that shown as a component part of the invention. Furthermore, the embodiments described can also be supplemented by further features of the invention that have already been described.

Figure 1:
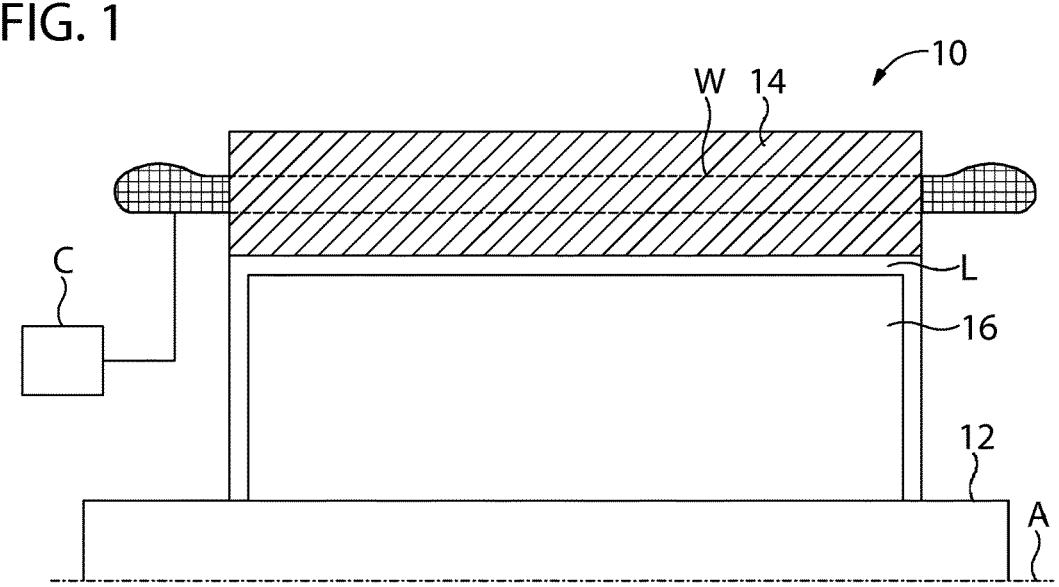
FIG. 1 is a diagrammatic, cross-sectional view of an embodiment of the inventive electric machine.
Figure 2:
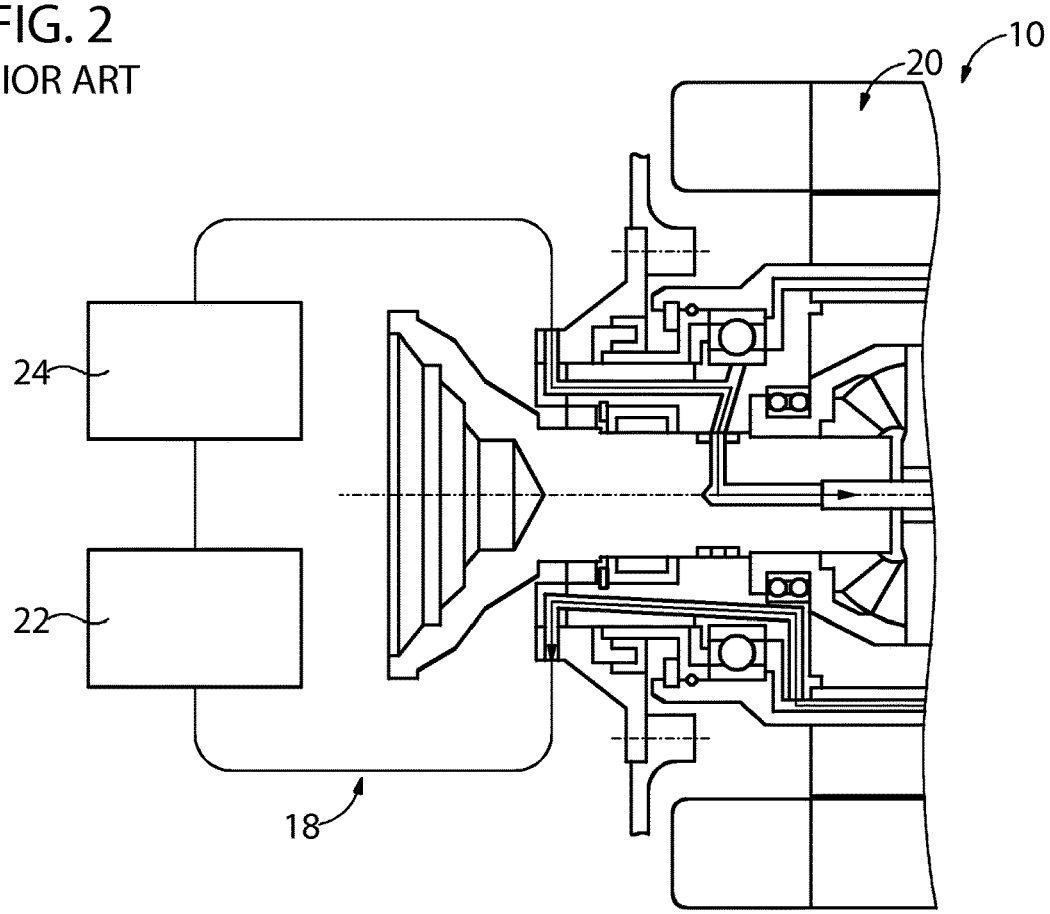
FIG. 2 is a fragmentary, cross-sectional view of an electric machine having two cooling circuits in accordance with the prior art.

Referring now to the figures of the drawings in detail and first, particularly, to FIG. 1 thereof, there is seen a general structure of an electric machine. An electric machine 10 is shown, which may be the electric machine according to the invention. The electric machine 10 may for example be a motor or a generator. In FIG. 1 a rotational axis A also represents a symmetrical axis of the illustration. The electric machine 10 includes a stator 14, in which windings W of electric coils are disposed, wherein only one of the windings W is represented in FIG. 1. The windings W are alternately supplied with power by an alternating power source C, which means that in the interior of the stator 14 a magnetic rotating field arises in an air gap L of the electric machine 10. The alternating power source C can for example be a controlled inverter or a fixed-frequency public electric supply grid or a frequency converter. A rotor 16 in the interior of the stator 14 is connected to a shaft 12 in a torsion-resistant manner. The shaft 12 is rotatably mounted about the axis of rotation A in the stator 14.

Figure 3:
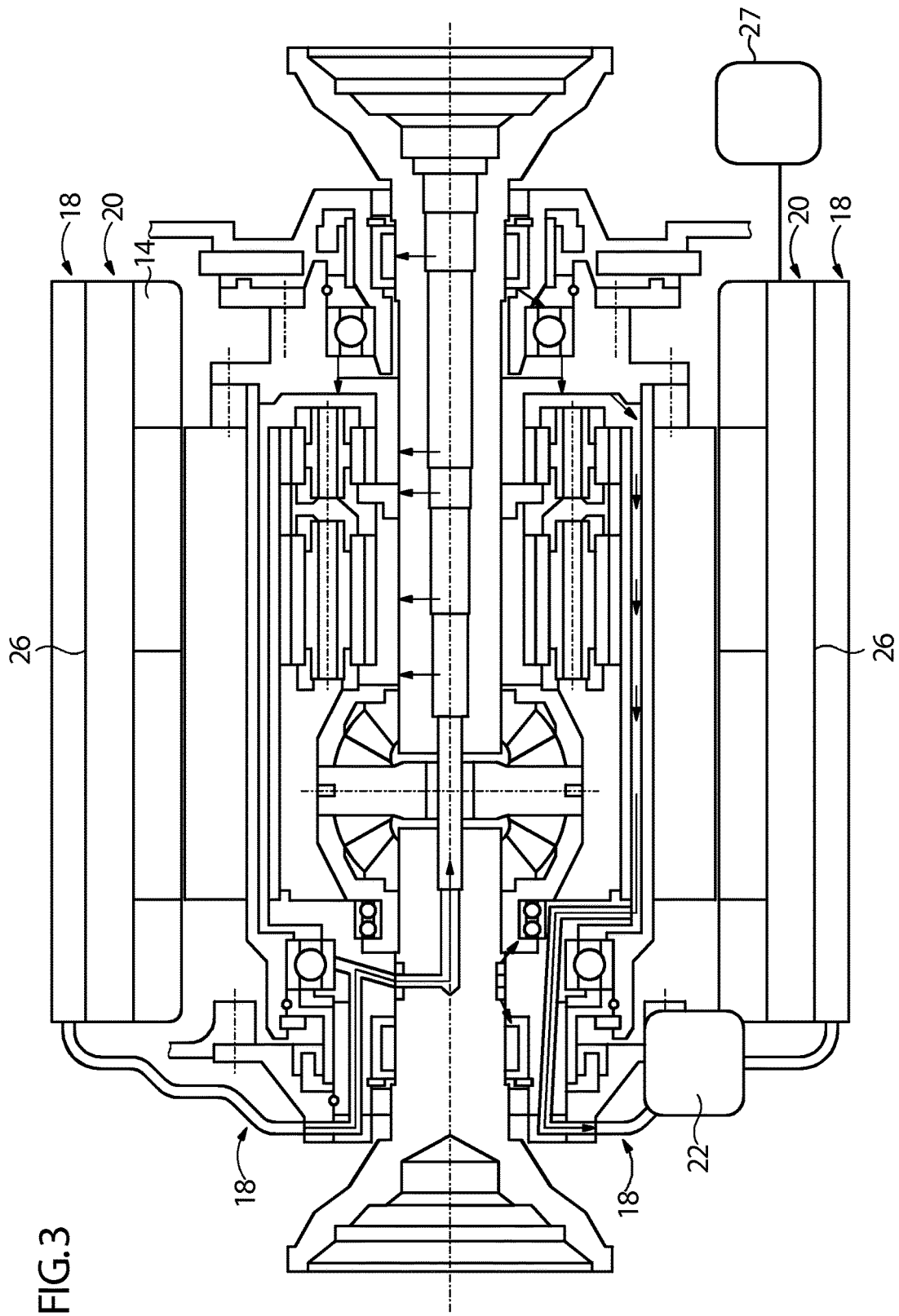
FIG. 3 is a cross-sectional view of an electric machine having a first and a second circuit.

FIG. 3 shows a diagrammatic representation of a cross-section of an electric machine having a first and a second circuit. The electric machine 10 in this case includes a first circuit 18 through which a first working fluid can flow and a second circuit 20 through which a second working fluid can flow. Both circuits are constructed to be hermetic in this case. As emerges from FIG. 3, a part of the first circuit 18 with a partial section of the second circuit 20 forms a common heat exchanger surface 26. Thermal energy can be transferred by way of this heat exchanger surface from the first working fluid of the first circuit 18 to the second working fluid of the second circuit 20 and/or vice versa from the second working fluid to the first working fluid by way of the heat exchanger surface 26.

The heat exchanger surface 26 is formed in such a way that at a region of the second circuit 20 a second lateral surface is disposed at a predefined distance about a tube surface, i.e. about a lateral surface, of the second circuit 20, so that the first working fluid can flow along the lateral surface of the second circuit 20 between the second lateral surface and the lateral surface of the second circuit 20. In other words a partial region, a region of a lateral surface, of the second circuit forms the common heat exchanger surface 26 with the first circuit 18. The common heat exchanger surface 26 runs axially along the electric machine in FIG. 3. However, the heat exchanger surface 26 can also be disposed at another position of the electric machine 10 and can be disposed correspondingly differently, for example perpendicular to the axis of the electric machine 10. More complex configurations may also be possible. In other words the two circuits (first circuit 18 and second circuit 20) can for example form a heat exchanger together with the heat exchanger surface.

The first circuit 18 in this case has a conveying device 22, which can for example be constructed as a pump, to convey the first working fluid flowing through the first circuit 18. The conveying device 22 can be integrated into a housing of the electric machine which is not shown in FIG. 3. In addition to the heat exchanger surface 26, the second circuit 20 has a heat exchanger 27 which is disposed upstream of the heat exchanger surface 26, through the use of which thermal energy can be transferred from the second working fluid to a third working fluid or the environment.

During operation of the electric machine 10 a first working fluid flows through the first circuit 18 and a second working fluid flows through the second circuit 20. The first working fluid can for example be an oil, in particular a gearbox oil. The second working fluid can represent a coolant, wherein the coolant can in particular be a water/glycol mix. As is apparent from FIG. 3, a gearbox can be integrated into the electric machine 10, wherein the first circuit 18 is a cooling circuit for the gearbox and the second circuit 20 is a cooling circuit for the rotor 16 and/or the stator 14 and/or the converter of the electric machine. In other words the first working fluid of the first circuit 18 absorbs the thermal losses from the gearbox and passes these thermal losses to the second working fluid in the second circuit 20 by way of the heat exchanger surface 26, whereas the second working fluid absorbs not only the thermal losses from the gearbox but also the thermal losses in the electric machine, in particular the thermal losses of the motor and/or of the converter, and dissipates these losses to the environment and/or a third working fluid.

For example, this thermal energy (thermal loss) can be transferred from the second working fluid, i.e. the coolant, to a third working fluid and/or the environment by using a heat exchanger 27 which is disposed upstream of the heat exchanger surface 26 and is coupled to the second circuit 20. The third working fluid can for example be ambient air or a standard coolant.

In one embodiment thermal energy can be transferred in a warm-up phase, for example in the start-up phase of the motor, from the second working fluid, i.e. the coolant, to the first working fluid, i.e. the gearbox oil, while a temperature of the first working fluid is still below a predefined operating temperature of the first working fluid. In this case the temperature of the first working fluid in a start-up phase is still below an operating temperature of the first working fluid, so that the second working fluid has a higher temperature level in the start-up phase than the first working fluid, so that thermal energy is transferred from the second working fluid to the first working fluid. As a result, the first working fluid, i.e. the gearbox oil, warms up quickly in the start-up phase, thereby reducing the losses from the first circuit 18 in the start-up phase.

In another operating form of the electric machine 10 the temperature of the first working fluid rises as a result of the thermal losses from the gearbox above a predefined operating temperature of the first working fluid. In this case thermal energy from the first working fluid, i.e. the gearbox oil, is transferred to the second working fluid, i.e. the coolant, while a temperature of the first working fluid is above the predefined operating temperature of the second working fluid. Thus the system always stands in thermal and dynamic equilibrium.

Figure 4:
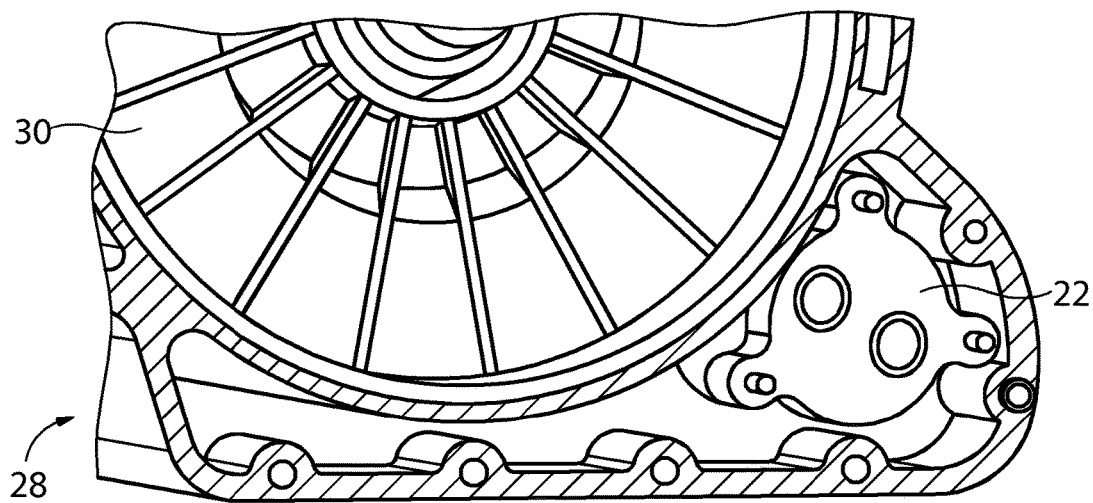
FIG. 4 is a fragmentary, sectional view of a housing of an electric machine having an integrated pump.
Figure 5:
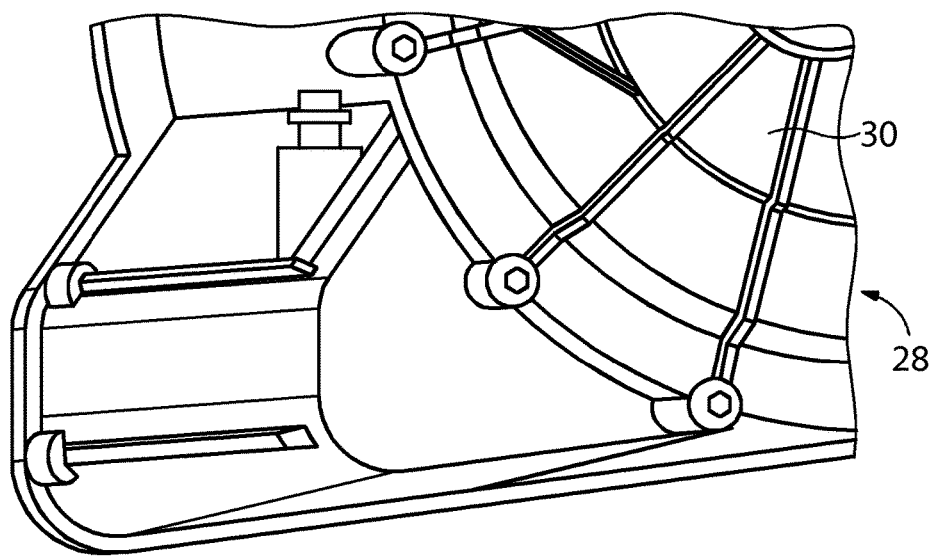
FIG. 5 is a fragmentary, sectional view of a housing of an electric machine.

FIGS. 4 and 5 show a housing of the electric machine according to the invention. FIG. 4 represents an inner side of a housing 28 of the electric machine. The part of the housing 28 in this case includes an end shield 30. Furthermore, a pump 22 of the first circuit can be integrated into the housing. FIG. 5 shows an outer face of the housing 28 of the electric machine 10.

Thus overall a motor cooling circuit emerges as an additional heat exchanger for cooling a second coolant. A technical aim of the invention is to use the cooling circuit of an electric motor as a heat exchanger for cooling another cooling circuit with another cooling medium. Advantages are achieved due to the reduction in cooling hoses and an additional second heat exchanger, which impacts on installation space and costs (materials, fittings and additional components). The technical achievement of the object of the invention is described in greater detail below on the basis of an application in the field of electric and/or hybrid vehicles.

Currently the cooling system is formed of a converter and a motor from a cooling circuit with a water/glycol mix. Furthermore, a rotor-integrated gearbox has been developed which is cooled by oil. Two cooling circuits with two heat exchangers are needed for this purpose: water/glycol for the motor and converter and possibly other components and oil for the gearbox.

The prior art already provides for oil pumps to be integrated into the motor housing. The aim is to use the existing water/glycol circuit of the motor for cooling the gearbox oil. To this end a second jacket is pulled over the currently existing cooling jacket, in which the oil is guided along the existing cooler. The link between the cooler and the gearbox cooling circuit can take different forms: firstly the link is achieved by using short cooling hoses and secondly by way of a link using cooling channels integrated into the mechanical system (for example end shields). The necessary external cooler for the other cooling medium (for example oil) of a different type becomes part of the motor. The cooling circuit for the other cooling medium is structurally integrated into the motor housing, so that no additional lines or other external interconnections of the line configuration are necessary. This produces a compact construction, since there is no need for an additional oil cooler. Furthermore it results in a cost reduction for the cooler by using the motor as one half of the cooler, and to a saving in the external pipework and mechanical fixing of the external cooler. Another advantage is the quick warming up of the gearbox oil and thus a reduction in the gearbox losses in the start-up phase. The dissipation of heat from the gearbox oil is ensured by way of the heat exchanger due to the high specific thermal capacity of water/glycol.

Overall the example shows how due to the invention a motor cooling circuit can be provided as an additional heat exchanger for cooling a second cooling medium.

The invention claimed is:

1. An electric machine, comprising:
    a first circuit through which a first working fluid flows;
    a second circuit through which a second working fluid flows;
    said first circuit and said second circuit being formed hermetically and having a common heat exchanger surface;
    a housing of the electric machine, said first circuit being completely integrated into said housing of the electric machine; and
    said common heat exchanger surface being constructed to transmit thermal energy at least one of from said first working fluid of said first circuit to said second working fluid of said second circuit or from said second working fluid to said first working fluid by way of said heat exchanger surface.

2. The electric machine according to claim 1, wherein said second circuit has a heat exchanger disposed upstream of said common heat exchanger surface, said heat exchanger being configured to transmit thermal energy from said second working fluid to a third working fluid.

3. The electric machine according to claim 1, wherein said first working fluid is an oil.

4. The electric machine according to claim 1, wherein said first working fluid is a gearbox oil.

5. The electric machine according to claim 1, wherein said second working fluid is a coolant.

6. The electric machine according to claim 1, wherein said second working fluid is a water/glycol mix.

7. A motor vehicle, comprising an electric machine according to claim 1.

8. The electric machine according to claim 1, wherein said housing includes:
    an end shield including cooling channels receiving the second working fluid;
    a first jacket formed by said end shield;
    a second jacket being pulled over said first jacket; and
    the first working fluid being guided along said cooling channels of said first jacket.

9. The electric machine according to claim 1, wherein said housing contains an end shield and said first circuit contains cooling channels being integrated into said end shield.

10. The electric machine according to claim 1, which further comprises:
    a mechanical gearbox integrated into the electric machine; and
    at least one of a rotor or a stator or a converter;
    said first circuit being a cooling circuit for said gearbox and said second circuit being a cooling circuit for said at least one of said rotor or said stator or said converter.

11. An electric machine, comprising:
    a first circuit through which a first working fluid flows;
    a second circuit through which a second working fluid flows;
    said first circuit and said second circuit being formed hermetically and having a common heat exchanger surface;
    a housing of the electric machine, said first circuit having a conveying device for conveying said first working fluid flowing through said first circuit, and said conveying device being integrated into said housing of the electric machine; and
    said common heat exchanger surface being constructed to transmit thermal energy at least one of from said first working fluid of said first circuit to said second working fluid of said second circuit or from said second working fluid to said first working fluid by way of said heat exchanger surface.

12. The electric machine according to claim 11, which further comprises:
a mechanical gearbox integrated into the electric machine; and
at least one of a rotor or a stator or a converter;
said first circuit being a cooling circuit for said gearbox and said second circuit being a cooling circuit for said at least one of said rotor or said stator or said converter.

13. A motor vehicle, comprising an electric machine according to claim 11.

14. The electric machine according to claim 11, wherein said housing includes:
an end shield including cooling channels receiving the second working fluid;
a first jacket formed by said end shield;
a second jacket being pulled over said first jacket; and
the first working fluid being guided along said cooling channels of said first jacket.

15. The electric machine according to claim 11, wherein said second circuit has a heat exchanger disposed upstream of said common heat exchanger surface, said heat exchanger being configured to transmit thermal energy from the second working fluid to a third working fluid.

16. The electric machine according to claim 11, wherein said first working fluid is oil.

17. The electric machine according to claim 11, wherein said first working fluid is gearbox oil.

18. The electric machine according to claim 11, wherein said second working fluid is a coolant.

19. The electric machine according to claim 11, wherein said second working fluid is a water/glycol mix.

20. The electric machine according to claim 11, wherein said housing contains an end shield and said conveying device is disposed on an inner side of said end shield.

21. A method for cooling an electric machine, the method comprising the following steps:
conducting a first working fluid through a first circuit, the first circuit having a conveying device being integrated into a housing of the electric machine;
conducting a second working fluid through a second circuit;
coupling the first circuit and the second circuit together by way of a common heat exchanger surface;
using the conveying device to convey the first working fluid flowing through the first circuit; and
transferring thermal energy at least one of from the first working fluid of the first circuit to the second working fluid of the second circuit or from the second working fluid to the first working fluid by way of the common heat exchanger surface.

22. The method according to claim 21, which further comprises transferring thermal energy from the second working fluid of the second circuit to a third working fluid by using a heat exchanger disposed upstream of the common heat exchanger surface.

23. The method according to claim 21, which further comprises transferring thermal energy in a warm-up phase from the second working fluid to the first working fluid only while a temperature of the first working fluid is still below a predefined operating temperature of the first working fluid.

24. The method according to claim 21, which further comprises transferring thermal energy from the first working fluid to the second working fluid only if a temperature of the first working fluid is above a predefined operating temperature.

25. The method according to claim 21, which further comprises:
providing an end shield forming a first jacket having cooling channels;
providing a second jacket being pulled over the first jacket;
guiding the first working fluid along the cooling channels; and
transferring thermal energy from the first working fluid to the second working fluid in the second jacket.

26. A method for cooling an electric machine, the method comprising the following steps:
conducting a first working fluid through a first circuit being completely integrated into a housing of the electric machine;
conducting a second working fluid through a second circuit;
coupling the first circuit and the second circuit together by way of a common heat exchanger surface; and
transferring thermal energy at least one of from the first working fluid of the first circuit to the second working fluid of the second circuit or from the second working fluid to the first working fluid by way of the common heat exchanger surface.

27. The method according to claim 26, which further comprises:
providing an end shield forming a first jacket having cooling channels;
providing a second jacket being pulled over the first jacket;
guiding the first working fluid along the cooling channels; and
transferring thermal energy from the first working fluid to the second working fluid in the second jacket.

28. The method according to claim 26, which further comprises transferring thermal energy from the second working fluid of the second circuit to a third working fluid by using a heat exchanger disposed upstream of the common heat exchanger surface.

29. The method according to claim 26, which further comprises transferring thermal energy in a warm-up phase from the second working fluid to the first working fluid only while a temperature of the first working fluid is still below a predefined operating temperature of the first working fluid.

30. The method according to claim 26, which further comprises transferring thermal energy from the first working fluid to the second working fluid only if a temperature of the first working fluid is above a predefined operating temperature.

* * * * *